United States Patent
Sait et al.

(10) Patent No.: US 7,176,032 B2
(45) Date of Patent: Feb. 13, 2007

(54) PROCESS FOR THE POLYMERISATION OF ISOBUTENE

(75) Inventors: Christian Sait, Cornillion-Confoux (FR); Gacem Benazzouz, Martigues (FR)

(73) Assignee: BP Chemicals Limited, London (GB)

( * ) Notice: Subject to any disclaimer, the term of this patent is extended or adjusted under 35 U.S.C. 154(b) by 388 days.

(21) Appl. No.: 10/311,018

(22) PCT Filed: Jun. 14, 2001

(86) PCT No.: PCT/GB01/02619

§ 371 (c)(1),
(2), (4) Date: Dec. 12, 2002

(87) PCT Pub. No.: WO01/96426

PCT Pub. Date: Dec. 20, 2001

(65) Prior Publication Data

US 2004/0015267 A1    Jan. 22, 2004

(30) Foreign Application Priority Data

Jun. 16, 2000  (FR) ................................. 00 07665

(51) Int. Cl.
G01N 33/44        (2006.01)
(52) U.S. Cl. ....................................................... 436/85
(58) Field of Classification Search .................. 436/85
See application file for complete search history.

(56) References Cited

U.S. PATENT DOCUMENTS 4,580,143 A * 4/1986 Larsen ........................... 347/7

(Continued)

FOREIGN PATENT DOCUMENTS

EP        0 099 131      1/1984

(Continued)

OTHER PUBLICATIONS

G.G. Ardell et al., "Model Prediction for Reactor Control", Fonderie, Fondeur, D'Augjourd'Hui, Fr, Editions Techniques Des Industries De la Fonderie, Paris, pp. 77-83, (Jun. 1, 1983).

*Primary Examiner*—Yelena G. Gakh
(74) *Attorney, Agent, or Firm*—Finnegan, Henderson, Farabow, Garrett and Dunner, L.L.P.

(57) ABSTRACT

A process for maintaining a property P of a polyisobutene around a target value V during a continuous polymerisation of isobutene in a reactor containing a boiling liquid reaction phase in equilibrium with a gas phase above the liquid phase. The process comprises continuously introducing, into the reactor, a catalyst and a C4 hydrocarbon feed and continuously withdrawing, from the reactor, the liquid reaction phase which is subsequently subjected, continuously, to at least one purification step to isolate the polyisobutene. The property P is chosen amongst the viscosity and the average molecular mass of the polyisobutene. The property P is maintained around the target value V (i) by measuring the isobutene partial pressure (PiC4) in the gas phase of the reactor, (ii) by calculating the isobutene concentration ($CiC4_{R2}$) in the boiling liquid reaction phase by means of a first model predicting the value of $CiC4_{R2}$ from the measured value of PiC4 and being based on liquid/vapor equilibrium law, (iii) by calculating an instantaneous value Pinst of the property P by means of a second model predicting the value of Pinst from the calculated value of $CiC4_{R2}$ and including at least one function of the isobutene polymerisation kinetics, and (iv) by varying at least one process parameter so as to make the instantaneous value Pinst tend towards the target value V.

11 Claims, 3 Drawing Sheets

U.S. PATENT DOCUMENTS 4,620,049 A    10/1986    Schmidt et al.

FOREIGN PATENT DOCUMENTS

| EP | 0 398 706 | 11/1990 |
|----|-----------|---------|
| FR | 2 625 506 | 7/1989 |
| FR | 2 749 014 | 11/1997 |
| FR | 2 790 760 | 9/2000 |
| FR | 2 794 757 | 12/2000 |
| WO | WO93/24533 | 12/1993 |
| WO | WO96/41822 | 12/1996 |

* cited by examiner

PROCESS FOR THE POLYMERISATION OF ISOBUTENE

BACKGROUND OF THE INVENTION

The present invention relates to a process which makes it possible to control the viscosity or the average molecular mass of a polyisobutene manufactured continuously in a polymerisation reactor.

It is known to polymerise isobutene continuously in a reactor comprising a boiling liquid reaction phase containing the monomer and the forming polymer, above which liquid phase is a gas phase comprising especially the monomer in equilibrium with the liquid phase. The continuous polymerisation is especially carried out by continuously introducing the monomer and a catalyst into the reactor and by continuously withdrawing from the reactor the liquid phase which is then generally subjected to one or more purification steps intended to isolate the polyisobutene manufactured.

The monomer often consists of isobutene coming from a mixture of butenes and/or of butanes.

In general, the polymerisation reaction is carried out continuously with the aid of a cationic-type catalyst and optionally a cocatalyst.

In a continuous polymerisation, the monomer feed, that is to say the isobutene feed, is generally produced from a cut of essentially C4 hydrocarbons, i.e. from a mixture containing isobutene, from other C4 olefins and/or from C3 to C7, especially C4, alkanes. The quality of the monomer feed may vary over time so that it affects the polymerisation conditions and consequently the quality of the polymer obtained.

Similarly, the quality of the catalyst and/or of the cocatalyst may vary over time and also may affect the quality of the polymer produced, particularly when the catalyst activity is very sensitive to poison variations.

The applications of polyisobutenes are often tied to their rheological properties. One of the essential characteristics of polyisobutene is its viscosity or its average molecular mass.

In a process for the continuous manufacture of polyisobutene, the average residence time of the polymer in the polymerisation reactor may be relatively long. Furthermore, the reaction mixture continuously withdrawn from the polymerisation reactor undergoes one or more polymer purification steps. The final polymer is thus isolated and purified after an additional time which may generally be several hours, for example from 3 to 12 hours, so that any analysis of the polymer after this last step is carried out very late. Consequently, the elapsed time between a measurable drift obtained from the analysis of the viscosity or of the average molecular mass of the polyisobutene and the correction of the said drift in the polymerisation reactor is relatively long. This type of drift therefore causes a product to be manufactured which is outside the viscosity or average molecular mass specifications, and this is generally so to a not insignificant extent.

Processes have been sought in the past to solve, in part, the abovementioned problems.

French Patent Application FR 2,625,506, discloses a process for the polymerisation of olefins, e.g. a mixture of butene monomers, wherein the number average molecular mass of samples of the polymer is determined by infrared spectroscopy. The datas are used to control the feed rate of the monomer mixture into the polymerisation reactor. A regulation using this process is also described, but this does not solve the problem of the present invention. In particular, nothing is said about measuring the isobutene partial pressure in the gas phase of the reactor.

The problem to be solved is to find a control process which makes it possible to correct the fluctuations in the viscosity or in the average molecular mass of the polyisobutene and therefore to adjust more rapidly the polymerisation conditions in the reactor so as to limit the amount of polyisobutene manufactured outside the specifications.

French Patent FR 2,790,760 (application Ser. No. 99/03267) describes a process for maintaining the viscosity or the average molecular mass of polyisobutene at a desired value in a continuous isobutene polymerisation process, wherein the partial pressure of the isobutene in the gas phase of a polymerisation reactor is held constant and wherein the partial pressure is influenced by the flow rate of the C4 hydrocarbon feed mixture and/or the flow rate of catalyst introduced into the reactor. This type of process had been employed especially because of the difficulty in measuring the isobutene concentration in a very viscous liquid polymerisation medium such as the boiling liquid reaction phase of the reactor.

French Patent FR 2,794,757 (application Setr. No. 99/07649) describes an improved process for maintaining a property P selected from the viscosity or the molecular weight of a polyisobutene at a constant desired value by correlating said property P with the partial pressure PiC4 of isobutene in the gas phase of a polymerisation reactor, calculating a corrected partial pressure for isobutene (PiC4)c from PiC4, from the polymerisation temperature and from the concentration of at least one of the components of the C4 hydrocarbon feed, and holding constant (PiC4)c at a given target value of the property P by acting on the introduction flow rates of the catalyst and of the C4 hydrocarbon feed in the reactor. The objective of this process is to be able to reduce, or even eliminate, the impact of various parameters that may modify the liquid/vapour equilibrium and influence the partial pressure PiC4 but without, as a result, directly affecting the viscosity or the average molecular mass of the polyisobutene manufactured.

Despite the improvements made by the above process, fluctuations in the viscosity or in the average molecular mass of the polyisobutene can nevertheless be seen.

U.S. Pat. No. 4,620,049 describes a process for controlling the molecular mass of a polybutene (PB). In this process, the molecular mass is correlated with operating variables selected from the polymerisation temperature and the concentration of isobutene in the reactor. Then a molecular mass of the product output is calculated and depending on the desired molecular mass, the polymerisation temperature and/or the concentration of isobutene can be altered. Moreover, moisture can be added to the reactor feed for lowering the molecular mass of the PB.

Nothing in these processes is said about measuring the isobutene partial pressure PiC4 in the gas phase of the reactor, about calculating a predicted value of the isobutene concentration in the boiling liquid reaction phase of the reactor with the help of a first model and from the measured value of PiC4, and about calculating a predicted value of the property P with the help of a second model comprising a function of the isobutene polymerisation kinetics and from the said predicted value of the isobutene concentration. However, according to the present invention it was observed that these missing elements are considered to be essential in order to obtain a more refined regulation of the property P.

SUMMARY OF THE INVENTION

More particularly, the present invention resides in a process for maintaining a property P of a polyisobutene around a target value V during a polymerisation of isobutene carried out continuously in a reactor comprising a boiling liquid reaction phase containing the monomer and the forming polymer and in equilibrium with a gas phase above the said liquid phase, the said polymerisation being carried out by continuously introducing, into the reactor, a catalyst, optionally a cocatalyst, and a C4 hydrocarbon feed comprising the monomer and by continuously withdrawing, from the reactor, the boiling liquid reaction phase which is subsequently subjected, continuously, to at least one purification step intended to isolate the polyisobutene manufactured, the property P chosen being the viscosity or the average molecular mass of the polyisobutene manufactured, which process is characterized in that the said property P of the polyisobutene manufactured is maintained around the said target value V:

i) by measuring at least the isobutene partial pressure PiC4 in the gas phase of the reactor,
ii) by calculating the isobutene concentration $CiC4_{R2}$ in the boiling liquid reaction phase by means of a first model predicting the value of $CiC4_{R2}$ from at least the previously measured value of PiC4 and being based on liquid/vapour equilibrium law;
iii) by calculating an instantaneous value Pinst of the property P by means of a second model predicting the value of Pinst from the previously calculated value of $CiC4_{R2}$ and comprising at least one function of the isobutene polymerisation kinetics and, optionally, at least one function of the polyisobutene purification;
iv) optionally, by calculating a mean value Pmean of the property P by means of a dynamic model predicting the value of Pmean from the previously calculated value of Pinst; and
v) by varying at least one process parameter so as to make the instantaneous value Pinst or the mean value Pmean tend towards the said target value V of the property P.

DETAILED DESCRIPTION OF THE INVENTION

Surprisingly, a process has been found which makes it possible to maintain a property P, chosen to be the viscosity or the average molecular mass of the polyisobutene manufactured, constant around a target value V without being constrained to systematically and periodically measuring the said property P. An essential character of the present invention is the use of a first model (a predictive calculation) predicting the value of the isobutene concentration $CiC4_{R2}$ in the boiling liquid reaction phase from the isobutene partial pressure PiC4 previously measured in the gas phase of the reactor, and the use a second model comprising a function of the isobutene polymerisation kinetics and predicting the instantaneous value of the property P from the previously calculated value of $CiC4_{R2}$. A process comprising predicting and calculating the value of the property P of the polyisobutene manufactured has been found which does not involve values resulting from measurements of the composition of the boiling liquid reaction phase, but values resulting from measurements of the gas phase of the reactor.

The process of the present invention is particularly useful when the desired value of the property P is maintained constant during the whole production. When the desired value of the property P has to be changed from one grade to another grade during a transition period for producing different qualities of polyisobutene in a continuous process, the transition period is advantageously carried out smoothly and very shortly with the help of the process of the present invention wherein the target value V of the property P is progressively changed step by step during the transition period.

The term "property P" should in general be understood to mean the viscosity or the average molecular mass of the polyisobutene, especially obtained after withdrawing the liquid reaction phase from the reactor, and in particular after at least one purification step intended to isolate the polymer manufactured.

According to one aspect of the present invention, the property P may be any viscosity of the polyisobutene manufactured, for example it may be chosen to be the kinematic viscosity, the dynamic viscosity, the specific viscosity, the reduced viscosity or the intrinsic viscosity.

The kinematic viscosity, which is generally defined as being the flow velocity of the polymer in a capillary, can be measured using, for example, the ASTM D445 standardized method. It is also possible to measure the dynamic viscosity, which is related to the kinematic viscosity by a relationship involving the density of the polymer, using, for example, a viscometer whose principle consists in measuring a pressure drop at a predetermined temperature and in calculating the viscosity from, for example, the Hagan Poiseuille equation. More particularly, a viscometer with the brand name VIS-COMATIC® manufactured by the company FLUIDYS-TEME may be used. The intrinsic viscosity may also be measured in a solvent, for example cyclohexane, at a given temperature, for example 30° C.

The viscosity of the polyisobutene manufactured may also be measured by infrared or near-infrared spectrophotometry, as described in French Patent FR 2,625,506.

The desired value of the viscosity of the polyisobutene manufactured may be that corresponding to:
(i) a kinematic viscosity measured at 100° C. ranging from 2 to 90,000, preferably from 5 to 50,000, especially from 10 to 40,000 centistokes (cSt); or
(ii) a dynamic viscosity measured at 100° C. ranging from 1 to 80,000, preferably from 4 to 45,000, especially from 8 to 36,000 centipoise (cP); or
(iii) an intrinsic viscosity, calculated from the measurements of the specific viscosity of the polyisobutene in solution in cyclohexane at 30° C., ranging from 0.7 to 32, preferably from 1 to 25, especially from 2 to 20 dl/g.

According to the present invention, the property P may also be the average molecular mass of the polyisobutene manufactured. The term "average molecular mass" should be understood to mean any average molecular mass of the polyisobutene, for example the number-average molecular mass $M_n$ or the weight-average molecular mass $M_w$, these generally being measured by gel permeation chromatography, a method often known by the name size exclusion chromatography, or else the viscosity-average molecular mass $M_v$. The average molecular mass of the polyisobutene manufactured may be measured by infrared or near-infrared spectrophotometry, like that described in French Patent FR 2,625,506.

The desired value of the average molecular mass of the polyisobutene manufactured may be that corresponding to:
(i) a number-average molecular mass $M_n$ ranging from 160 to 8,000, preferably from 300 to 6,700, especially from 400 to 6,000 daltons; or
(ii) a weight-average molecular mass $M_w$ ranging from 250 to 25,000, preferably from 400 to 20,000, especially from 600 to 18,000 daltons; or
(iii) a viscosity-average molecular mass $M_v$ ranging from 190 to 19,000, preferably from 380 to 16,900, especially from 500 to 15,000 daltons.

In the present invention, the polyisobutene may be an isobutene homopolymer or, more generally, a copolymer of isobutene with at least one other C4 olefin in a proportion of less than 30% and preferably less than 25% by weight, for example from 0.1 to 25% by weight b general, high-molecular-weight polyisobutenes contain mainly isobutene. Low-viscosity polyisobutenes may often consist in copolymers of isobutene with 1-butene and/or 2-butene.

Thus, generally in the process of the present invention, the monomer consists of isobutene, and the eventual comonomers consist of 1-butene, cis-2-butene and trans-2-butene. The polymerisation is carried out by continuously introducing into the reactor a C4 hydrocarbon feed comprising the monomer with eventually at least one other C4 olefin and/or at least one C3 to C7 (cyclo)alkane, in particular a C4 alkane. Such a C4 hydrocarbon feed may comprise, by weight, from 0 to 40% and preferably from 0 to 30% 1-butene, from 0 to 20% and preferably from 0 to 15% cis-2-butene, from 0 to 40% and preferably from 0 to 30% trans-2-butene, from 0 to 50% and preferably from 0 to 40% of one or more C3 to C7 (cyclo)alkanes, such as butane or isobutane, and from 5 to less than 100% and preferably from 10 to less than 50% isobutene. The process of the present invention is also useful when the C4 hydrocarbon feed introduced into the reactor may comprise, by weight, up to 99%, preferably 99.9% and especially 99.99% isobutene.

The C4 hydrocarbon feed may be introduced directly into the boiling liquid reaction phase. It may also be introduced indirectly into the boiling liquid reaction phase by adding it to any other liquid introduced into the reactor, for example into a liquid obtained by cooling and condensing an easily condensable gas from the gas phase escaping from the upper part of the reactor and returned to the reactor. The C4 hydrocarbon feed may also be introduced in its entirety into the gas phase as a liquid hydrocarbon spray, as described in French Patent FR 2,749,014.

The boiling liquid reaction phase generally contains isobutene and one or more other C4 olefins and/or one or more C3 to C7 (cyclo)alkanes, the polymer in the course of formation, the catalyst and, optionally, a cocatalyst.

The boiling liquid reaction phase maybe agitated by any known means, especially using a mechanical stirrer. The boiling liquid reaction phase may also be agitated by a forced circulation of this medium, which may comprise the withdrawal from and the reintroduction into the reactor of part of the boiling liquid reaction phase, especially using a so-called recycling pump.

Above the boiling liquid reaction phase is a gas phase, especially an easily condensable gas phase. Consequently, an easily condensable gas can escape from the upper part of the reactor containing the gas phase. In general, this gas is condensed outside the reactor, especially in order to remove the heat from the polymerisation reaction. After cooling and condensing this gas, a cooled liquid is recovered which can be recycled into the gas phase and/or into the boiling liquid reaction phase. Part or all of the C4 hydrocarbon feed may be added to this liquid.

In order to carry out the polymerisation of isobutene, a catalyst generally suitable for the cationic polymerisation of olefins is used, often called a cationic-type catalyst, and optionally in the presence of a cocatalyst. More particularly, the catalyst may be a halogen compound of boron, such as boron trifluoride, or an organoaluminium compound, for example of formula $AlR_nX_{n-3}$ in which R is an alkyl radical having for example from 1 to 10 carbon atoms, X is a chlorine or bromine atom and n is an integer or a fraction ranging from 0 to 3. The cocatalyst may be water, hydrochloric acid, an alkyl halide, such as tert-butyl chloride, or else an alcohol, such as ethanol, particularly when boron trifluoride is used as catalyst.

The polymerisation reaction may be carried out in particular using an alkyl halide, such as tert-butyl chloride as cocatalyst according to the process described in European Patent Application EP-A-0,645,402 in combination with ethyl aluminium dichloride (EADC) as catalyst.

The molar ratio of the amount of cocatalyst to that of catalyst which are introduced into the reactor is advantageously maintained at a constant value over time and generally is in the range from 0.05 to 20, preferably from 1 to 10.

The catalyst and the cocatalyst are preferably introduced into the reactor separately from each other. One of them may be introduced into the C4 hydrocarbon feed. Part or all of the cocatalyst or of the catalyst may be introduced into the reactor as a mixture with another liquid, for example part of the boiling liquid reaction phase withdrawn and recycled, making it possible to ensure that the reaction mixture is agitated.

The polymerisation reaction may be carried out at a polymerisation temperature T in the range from −30 to +50° C., preferably from −20 to +25° C. The polymerisation temperature T may be measured in the gas phase or in the boiling liquid reaction phase in equilibrium with the said gas phase.

The absolute pressure of the reactor may vary with time and in a range from 0.03 to 1 and preferably from 0.05 to 0.5 MPa. The isobutene partial pressure PiC4 in the gas phase of the reactor maybe greater than or equal to $1\times10^{-4}$ and less than 1 MPa, preferably greater than or equal to $3\times10^{-4}$ and less than 0.5 MPa.

The polymerisation temperature T is preferably kept constant by acting on the coolant for cooling the reactor or on the coolant of a condenser placed on a line for recycling the gas phase escaping from the upper part of the reactor. Maintaining the polymerisation temperature T at a constant value during the polymerisation is preferred for obtaining a polyisobutene having a constant quality and particularly a constant content of unsaturated hydrocarbon end groups.

The process according to the present invention may also comprise the use of a centralized control system so that to monitor the various process parameters, such as the polymerisation temperature T, the total pressure, the partial pressures of the various components of the gas phase of the reactor, the introduction flow rates of the various reactor feeds in the reactor (e.g. the catalyst, the cocatalyst and the C4 hydrocarbon feed) and the withdrawal rate of the boiling liquid reaction phase from the reactor, the distillation pressure Pd and the distillation temperature Td of the polyisobutene in the purification step, in order to obtain the polyisobutene with the desired quality. This centralized control system may comprise computing modules and/or regulators. A regulator is defined as a system allowing a measured value to be compared with a target value by acting on one or more process parameters so that the said measured value moves over time towards the said target value by taking into account the difference between these two values. A distinction maybe made between, as main inputs of a regulator, the measured value of the process parameter and the set-point for the said parameter, which set-point may be entered directly into the regulator by an operator as the target value, or else it may be displayed as a result of a calculation carried out by a computing module.

The various regulating and control operations carried out by a centralized control system, particularly by a regulator, may be performed directly by an operator.

According to the present invention, the isobutene partial pressure PiC4 in the gas phase of the reactor is measured. In addition, at least one of the process parameters chosen from the polymerisation temperature T and the concentration Ci of at least one compound "i" of the C4 hydrocarbon feed in the said feed and/or in the gas phase of the reactor may preferably be also measured. In particular, at least one of the process parameters chosen from the catalyst feed rate Qc in the reactor, the cocatalyst feed rate Qco in the reactor, the distillation pressure Pd and the distillation temperature Td at which the polyisobutene manufactured is distilled in the purification step, may also be measured.

The isobutene partial pressure PiC4 generally is the result of a calculation based on the isobutene (mass) concentration in the gas phase of the reactor and on the relative or absolute total pressure in the reactor. Especially it is the result of a calculation comprising multiplying the absolute or relative total pressure in the reactor with the isobutene concentration in the gas phase. The expression "measuring the isobutene partial pressure PiC4" should normally be understood to mean the result of the aforementioned calculation and obtained from the measurements of the relative or absolute total pressure in the reactor and of the isobutene concentration in the gas phase, for example obtained by using a gas chromatograph. Thus, the action which consists in measuring the isobutene partial pressure PiC4 usually amounts to measuring the above two values and in performing the above calculation.

The total pressure in the reactor is not generally kept constant and it varies according to fluctuations such as fluctuations of the quality of the C4 hydrocarbon feed, the quality of the (co-)catalysts, the height of the liquid reaction phase in the reactor, and the monomer conversion rate into polyisobutene.

The term "concentration" used in the present specification may generally refer to a mass, molar or volume concentration. The term "concentration" refers by default to a mass concentration.

According to the present invention, the isobutene concentration $CiC4_{R2}$ in the boiling liquid reaction phase is calculated with the help of a first model, preferably a static model, predicting the value of $CiC4_{R2}$ from at least the previously measured value of the isobutene partial pressure PiC4 in the gas phase of the reactor. The first model is based on liquid/vapour equilibrium law. Thus, the first model may comprise function(s) Fi(Ci,T) of the concentration Ci of at least one compound "i" of the C4 hydrocarbon feed in the said feed or in the gas phase of the reactor, and of the polymerisation temperature T. Alternatively, the first model may comprise a function F1(Ci) of the concentration Ci of at least one compound "i" of the C4 hydrocarbon feed in the said feed or in the gas phase of the reactor and/or a function F2(T) of the polymerisation temperature T.

The expression "isobutene concentration $CiC4_{R2}$ in the boiling liquid reaction phase" should be understood to mean a mass, volume or molar concentration of isobutene expressed with respect to the mass or volume of the boiling liquid reaction phase of the reactor, or with repect to the mass or volume of the C4 hydrocarbon feed introduced in a given time (e.g. the mean residence time of the boiling liquid reaction phase in the reactor).

The isobutene concentration $CiC4_{R2}$ in the boiling liquid reaction phase is calculated with the help of the first model essentially based on liquid/vapour equilibrium law. Thus the calculation preferably comprise multiplying the measured value of the isobutene partial pressure PiC4 of the reactor with the liquid/vapour equilibrium coefficient $k_{H\ (Henry's\ constant)}$ which may be regarded as a parameter and which generaly depends on the composition of the C4 hydrocarbon feed and on the polymerisation temperature T.

More particularly, the first model may be expressed as a function of the isobutene partial pressure PiC4 of the gas phase and as a function of the concentration Ci of at least one compound "i" of the C4 hydrocarbon feed in the said feed or in the gas phase of the reactor, and of the polymerisation temperature T. Preferably it may be in the form of a product of PiC4 with at least one function Fi of the concentration Ci and of the temperature T, e.g in the form of the following formula:

$$CiC4_{R2} = PiC4 \cdot \left[\sum_i Fi(Ci, T)\right]^{-1} \quad (1a)$$

or preferably $$CiC4_{R2} = (PiC4 + \Delta P) \cdot [\Sigma_i Fi(Ci,T)]^{-1} \quad (1b)$$

wherein ΔP is a constant (homogeneous to a pressure).

A preferred first model may be expressed as a function of the isobutene partial pressure PiC4 of the gas phase of the reactor, of a function F1(Ci) of the concentration Ci of at least one compound "i" of the C4 hydrocarbon feed in the said feed or in the gas phase of the reactor, and of a function F2(T) of the polymerisation temperature T, e.g. in the form of the following formula:

$$CiC4_{R2} = PiC4 \cdot [k_{HO} \cdot F1(Ci) \cdot F2(T)]^{-1} \quad (2a)$$

or preferably $$CiC4_{R2} = (PiC4 + \Delta P) \cdot [k_{HO} \cdot F1(Ci) \cdot F2(T)]^{-1} \quad (2b)$$

with $k_{HO}$ being a constant and ΔP a (positive or negative) constant homogeneous to a pressure.

In the above formulae (1a), (1b), (2a) or (2b) of the first model, each compound "i" of the C4 hydrocarbon feed corresponding to each function Fi(Ci,T) or to the function F1(Ci) may be chosen from olefins, such as isobutene, 1-butene, cis-2-butene and trans-2-butene, and at least one C3 to C7 alkane and/or cycloalkane, particularly a C4 alkane such as butane and/or isobutane.

The function F1 (Ci) may be expressed in the form of a sum of linear functions of the concentration Ci of at least one compound "i" of the C4 hydrocarbon feed in the said feed or in the gas phase of the reactor, centred around the mean values of the said concentrations. $F1(Ci)$ may thus be written as the following equation:

$$F1(Ci) = 1 + \sum_i ki \cdot (Ci - Ci_{mean}) \quad (3)$$

with $ki$ being a (positive or negative) constant and $Ci_{mean}$ a constant homogeneous to a concentration.

The function $F2(T)$ of the polymerisation temperature T may be written as the following equation:

$$F2(T) = 1 + A2 \cdot (T + B2)^{C2} \quad (4)$$

with A2, B2 and C2 being constants.

The concentration Ci of at least one compound "i" of the C4 hydrocarbon feed in the said feed or in the gas phase of the reactor is measured, for example, using a gas chromatograph. The polymerisation temperature T may be measured by any known method.

The calculation of the functions $Fi(Ci,T)$, $F1(Ci)$ and $F2(T)$ may be performed periodically by a computing module.

According to the present invention, an instantaneous value Pinst of the property P is calculated by means of a second model, preferably a static model, predicting the value of Pinst from the previously calculated value of $CiC4_{R2}$ and comprising at least one function of the isobutene polymerisation kinetics. The calculation of the instantaneous value Pinst is generally performed by means of a static-type model, that is to say using a model for the predictive calculation of the value of P at the instant t corresponding to the polyisobutene produced in the steady state under the process conditions used at the said instant t.

The function of the isobutene polymerisation kinetics used in the second model may essentially comprise a product of a function of the isobutene concentration CiC4R2 in the boiling liquid reaction phase of the reactor with at least a function of the catalyst concentration Cc in the boiling liquid reaction phase. More particularly, it may comprise at least two functions combined together and selected from the following functions: a function $F3(Ci_{R2})$ of the concentration $Ci_{R2}$ of at least one compound "i" of the boiling liquid reaction phase (comprising isobutene) in the said liquid reaction phase, a function $F4(T)$ of the polymerisation temperature T, a function $F5(Cc)$ of the catalyst concentration Cc in the boiling liquid reaction phase, and a function $F6(Cco)$ of the cocatalyst concentration Cco in the boiling liquid reaction phase. The function of the isobutene polymerisation kinetics may advantageously comprise a product of factors in the form of the following equation:

$$Pinst = C \cdot C_3^{F3} \cdot C4^{F4} \cdot C5^{F5} \cdot C6^{F6} \quad (5)$$

with C, C3, C4, C5 and C6 being constants, and preferably equal to 10.

The function F3 may advantageously be a function $F3(CiC4_{R2})$ of the isobutene concentration $CiC4_{R2}$ in the boiling liquid reaction phase, preferably an increasing function or a function which increases towards a plateau for increasing values of $CiC4_{R2}$ By definition, a function f(x) is generally said to be of the type having a plateau, when f(x) tends towards a finite value for values of x tending towards infinity. The function $F3(CiC4_{R2})$ may, for example, be expressed as the following equation:

$$F3(CiC4_{R2}) = A3 \cdot CiC4_{R2} \cdot (1 + B3 \cdot CiC4_{R2})^{-1} \quad (6)$$

with A3 and B3 being (preferably positive) constants.

The function $F4(T)$ may advantageously be a decreasing function or a function which decreases towards a plateau for increasing values of T. Preferably, the function $F4(T)$ may be expressed as one of the two following equations:

$$F4(T) = A4 \cdot T \quad (7a)$$

or $$F4(T) = A4 \cdot T \cdot (1 + B4 \cdot T)^{-1} \quad (7b)$$

with A4 and B4 being (preferably negative) constants.

The function $F5(Cc)$ may advantageously be a decreasing function which tends towards zero for increasing values of the catalyst concentration Cc in the boiling liquid reaction phase. Preferably, the function $F5(Cc)$ may be expressed as the following equation:

$$F5(Cc) = A5 \cdot [1 + B5 \cdot (Cc)^n]^{-1} \quad (8)$$

with A5, B5 and n being (preferably positive) constants, in particular n being a number in the range from 2 to 3, e.g. n=2.

The function $F6(Cco)$ may advantageously be a decreasing function which tends towards zero for increasing values of the cocatalyst concentration Cco in the boiling liquid reaction phase. Preferably, the function $F6(Cco)$ may be expressed as the following equation:

$$F6(Cco) = A6 \cdot [1 + B6 \cdot (Cco)^m]^{-1} \quad (9)$$

with A6 and B6 being (preferably positive) constants and m being a (preferably positive) constant, in particular m=1.

The expressions "concentration Cc" and "concentration Cco" should be understood to mean a mass, volume or molar concentration respectively of catalyst and cocatalyst expressed with respect to the mass or volume of the boiling liquid reaction phase of the reactor, or with respect to the mass or volume of the C4 hydrocarbon feed introduced in a given time (e.g. the mean residence time of the boiling liquid reaction phase in the reactor). Thus, the catalyst or cocatalyst concentration may be defined as being the ratio of the molar, mass or volume amount of catalyst or cocatalyst introduced, directly or indirectly, into the reactor to the mass or volume amount of C4 hydrocarbon feed introduced into the reactor during the same time.

According to one particular embodiment of the present invention, an instantaneous value Pinst of the property P is calculated by means of a second model, preferably a static model, simultaneously comprising at least one function of the isobutene polymerisation kinetics and at least one function of the polyisobutene purification. The function of the polyisobutene purification may advantageously be a function $F7(Pd,Td)$ of the distillation pressure Pd and of the distillation temperature Td at which the polyisobutene manufactured is distilled in the purification step. The function $F7(Pd,Td)$ may be a decreasing function for increasing values of Pd, and an increasing function for increasing values of Td. Preferably, the function $F7(Pd,Td)$ may be expressed as the following equation:

$$F7(Pd,Td) = A7 \cdot Pd + B7 \cdot Td \quad (10)$$

with A7 being a (preferably negative) constant and B7 a (preferably positive) constant.

The second model predicting the value of Pinst may advantageously be a product of factors in the form of the following equation:

$$Pinst = C \cdot C3^{F3} \cdot C4^{F4} \cdot C5^{F5} \cdot C6^{F6} \cdot C7^{F7} \quad (11)$$

with C, C3, C4, C5, C6 and C7 being constants, and preferably equal to 10.

According to another particular embodiment of the present invention, a mean value Pmean of the property P of the polyisobutene manufactured may optionally be calculated by means of a dynamic model predicting the value of Pmean from the previously calculated value of Pinst. When in a continuous process, different qualities of polyisobutene can be produced. Thus the property P of the polyisobutene can be changed from one value to another value, and the production comprises a transition step wherein the mean value Pmean is different from the instantaneous value Pinst. In the steady state, these two values are approximately the same. The mean value Pmean may be calculated by means of a dynamic model. The term "dynamic model" should be understood to mean a calculation which makes it possible to take into account the transition step in order to determine the mean value of the property P. The calculation of the mean value Pmean may advantageously be performed iteratively by means of a formula of the type:

$$Pmean(t+dt) = X \cdot Pinst(t+dt) + (1-X) \cdot Pmean(t) \quad (12)$$

X being the weight fraction of polyisobutene manufactured between the instants t and t+dt.

According to the present invention, at least one process parameter is varied so as to make the instantaneous value Pinst or the mean value Pmean of the property P tend towards the target value V of the said property P. The process parameters can be chosen from the polymerisation temperature T, the catalyst feed rate Qc in the reactor, the cocatalyst feed rate Qco in the reactor, the C4 hydrocarbon feed flow rate Qh in the reactor, the distillation pressure Pd and the distillation temperature Td at which the polyisobutene manufactured is distilled in the purification step. Preferably when it is desired to produce polyisobutene continuously with a constant quality, particularly with a constant content of unsaturated hydrocarbon end groups, the process parameters can be chosen from the catalyst feed rate Qc in the reactor, the cocatalyst feed Qco in the reactor and the C4 hydrocarbon feed rate Qh in the reactor.

According to one aspect of the present invention, the property P of the polyisobutene manufactured is maintained around a target value V by varying the feed rates Qc and/or Qco respectively of the catalyst and/or the cocatalyst in the reactor. The mean value Pmean, or the instantaneous value Pinst, may be compared with the target value V and the difference E=V−Pmean or E=V−Pinst may be calculated. Depending on the difference E, the feed rates Qc and/or Qco may be varied in order to make the property P of the polyisobutene manufactured tend towards the target value V. If the difference E is negative or below the negative limit of a predetermined range centred around zero, the feed rates Qc and/or Qco may be increased. If the difference E is positive or above the positive limit of the said range, the feed rates Qc and/or Qco may be decreased. If the difference E is zero or lies within the limits of the said range, the feed rates Qc and/or Qco may remain unchanged. This type of regulation may advantageously be carried out by the use of a regulator.

According to another aspect of the present invention, the property P of the polyisobutene manufactured is maintained around a target value V by varying the feed rate Qh of the C4 hydrocarbon feed introduced into the reactor. In this case, the variations made in the feed rate Qh with respect to the difference E are performed in exactly the opposite way to those previously described with regard to the feed rates Qc and Qco, namely, instead of increasing the feed rate Qh, it is decreased, and vice versa.

A variant of the above versions of the process may consist in making the regulator vary the feed rates Qc, Qco and Qh simultaneously. As described above, a calculated value of the property P of the polyisobutene manufactured, Pmean or Pinst, is compared with the set-point C of the regulator and the difference, E=C−Pmean or E=C−Pinst, is calculated. Depending on the difference E, the regulator varies the feed rates Qh, Qc and Qco simultaneously so as to make the property P of the polyisobutene manufactured tend towards the set-point C: either the difference E is negative or below the negative limit of a predetermined range centred around zero, the feed rate Qh then being decreased and the feed rates Qc and Qco increased; or the difference E is positive or above the positive limit of the said range, the feed rate Qh then being increased and the feed rates Qc and Qco decreased; or the difference E is zero or lies within the limits of the said range, the feed rates Qh, Qc and Qco then remaining unchanged.

According to one of the preferred embodiments of the present invention, it is more advantageous to maintain the property P of the polyisobutene manufactured constant around the target value V by varying the feed rates Qc and Qco respectively of the catalyst and the cocatalyst in the reactor.

One of the advantages of the present invention is that it improves the stability of the polymerisation reaction and decreases the polydispersity, that is to say the width of the distribution of the molecular masses of the polyisobutene manufactured, and this being so whatever the slight fluctuations in the polymerisation temperature or in the quality of the C4 hydrocarbon feed.

Another advantage is that it allows a refined regulation of the property P of the polyisobutene manufactured associated, in particular, with the use of the polyisobutene partial pressure PiC4 in the gas phase of the reactor in the first model used for predicting and calculating the isobutene concentration $CiC4_{R2}$ in the boiling liquid reaction phase of the reactor.

Yet another advantage of the present invention is to be able to maintain the polymerisation temperature T at a constant value during the polymerisation by means of a regulation independent of the regulation according to the method of the present invention. By maintaining the polymerisation temperature T at a constant value independently of the viscosity or of the average molecular mass, it is possible to obtain a polymer whose quality and whose content of unsaturated hydrocarbon end groups are constant and stable over time.

The present invention also is particularly useful for reducing the grade transition periods in a continuous polyisobutene production, when different polyisobutene grades have to be produced. Thus it is estimated that if in an industrial plant having a mean polyisobutene production rate of 200 T/day and using the process of the present invention, four grade transition periods are carried out per month, about 1600 T of off-specification polybutene can be avoided per year.

Figure 1:
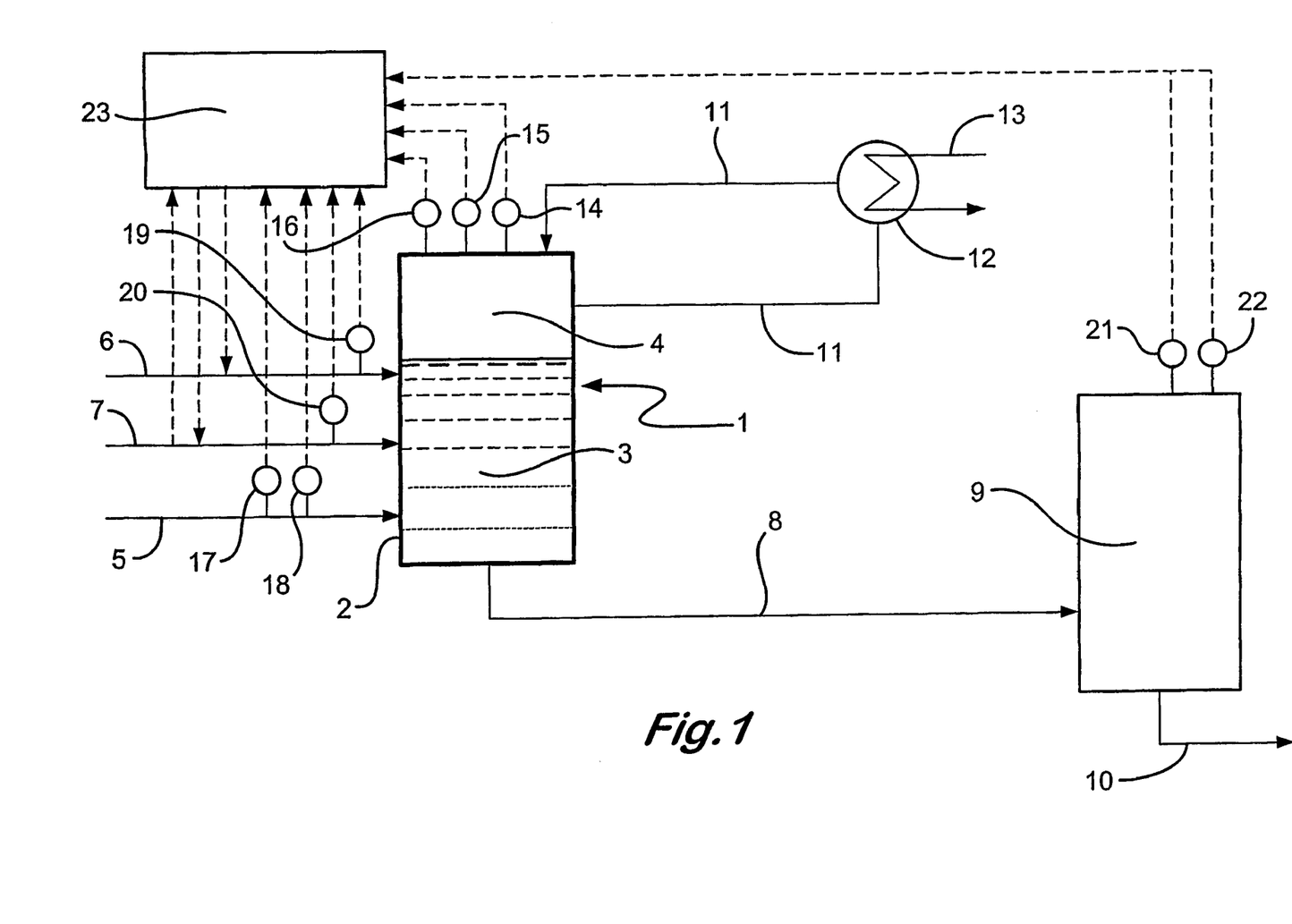
FIG. 1 shows schematically an example of a process for the continuous manufacture of polyisobutene.

FIG. 1 shows schematically a process for manufacturing polyisobutene by the continuous polymerisation of isobutene in a reactor (1) which mainly comprises a cylindrical part (2). The reactor contains a boiling liquid reaction phase (3) and a gas phase (4) above and in equilibrium with the said liquid phase. The reactor is provided with a feed line (5) for a C4 hydrocarbon feed which includes the monomer, with a catalyst feed line (6) and optionally with a cocatalyst feed line (7), the said lines running into the cylindrical part (2) containing the boiling liquid reaction phase (3). The lower part of the reactor is provided with a line (8) for withdrawing the boiling liquid reaction phase, which line (8) runs towards a purification device (9) comprising, for example, at least one distillation column intended to isolate, via a line (10), the desired polymer. The upper part of the factor containing the gas phase (4) may be provided with a gas phase recycling line (11). Mounted on the line (11) is a condenser (12) which allows the gas phase escaping from the reactor (1) to be cooled and condensed by means of a coolant which flows in a line (13), the resulting condensate being returned to the reactor (1) via the line (11). In the upper part of the reactor containing the gas phase, a pressure gauge (14) measures the total pressure in the reactor, a thermometer (16) measures the polymerisation temperature in the reactor and an analyser (15), such as a gas chromatograph, measures the concentration (for example mass concentration) of isobutene and of at least one of the other compounds in the gas phase. Provided on the feed line (5) for the C4 hydrocarbon feed are analysers (17) and (18), such as gas chromatographs, which are used to measure the concentration (for example mass concentration) of isobutene and of at least one compound "i" of the C4 hydrocarbon feed in the said feed. Two flowmeters (19) and (20) are used to measure the feed rates of the catalyst and of the cocatalyst in the reactor and to calculate their concentrations Cc and Cco respectively. A pressure gauge (21) and a thermometer (22) are placed on the polyisobutene purification device (9). These measurement instruments are connected to a centralized control system (23), the components of which, such as regulators and computing modules, are described schematically in FIG. 2.

Figure 2:
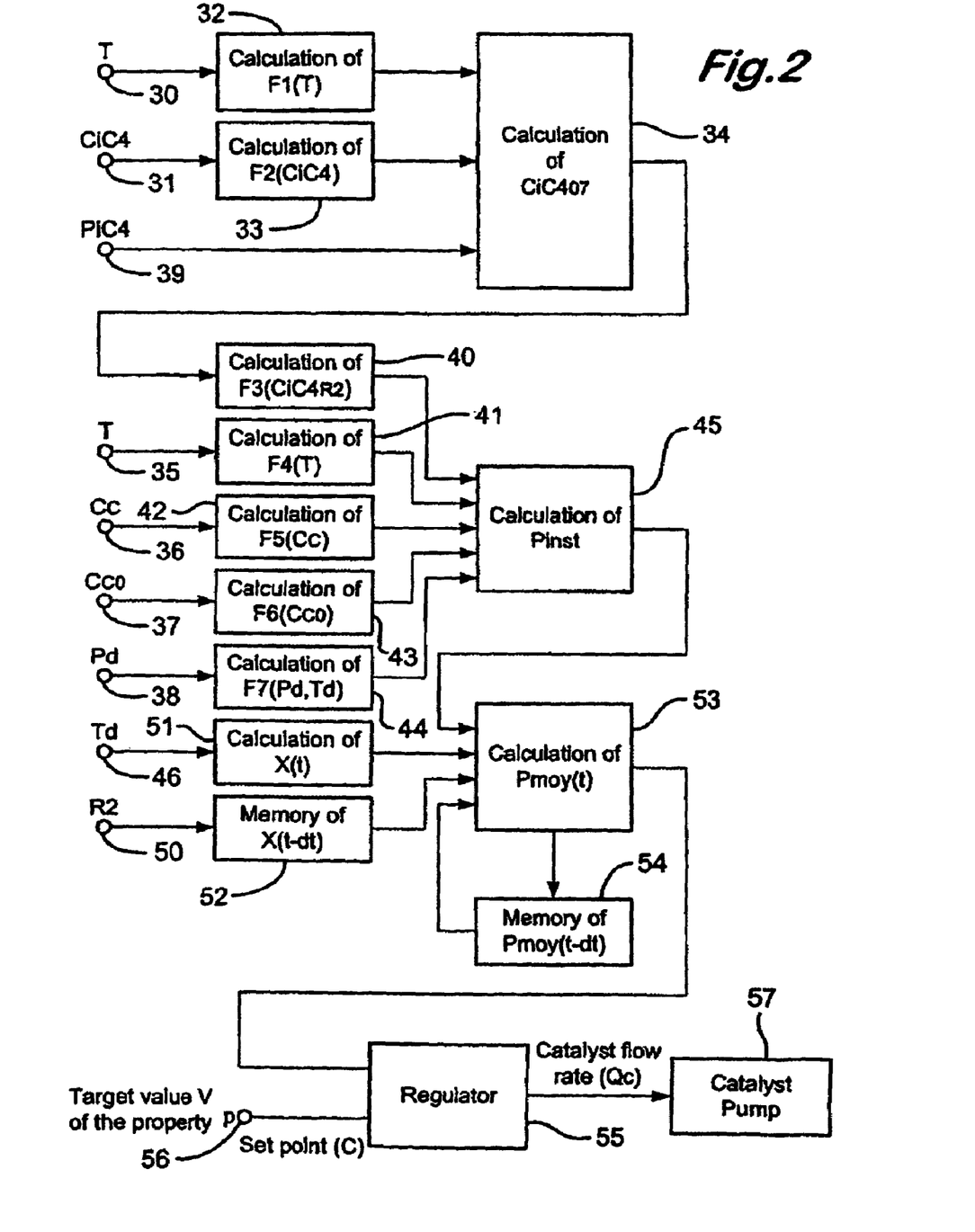
FIG. 2 shows by way of example a block diagram for regulating the property P of the polyisobutene manufactured continuously according to the present invention.

FIG. 2 shows, by way of example, a regulation flow diagram according to the process of the present invention. A computing module (34) is used to calculate the isobutene concentration $CiC4_{R2}$ in the boiling liquid reaction phase with the help of a first model predicting the said isobutene concentration from the measured value of the isobutene partial pressure PiC4 in the gas phase of the reactor (39) and based on liquid/vapour equilibrium law, e.g. based on the two functions F1 and F2 generated by computing modules (32) and (33), the inputs of which are the polymerisation temperature T (30) and the isobutene concentration CiC4 in the C4 hydrocarbon feed (31), respectively. A computing module (45) comprises a second model essentially comprising at least one function of the isobutene polymerisation kinetics. It is used to calculate the predicted value of the instantaneous value Pinst of the property P of the polyisobutene from the values previously calculated by intermediate computing modules (40), (41), (42), (43) and (44). The module (40) is used to calculate the function F3 ($CiC4_{R2}$) based on the value calculated by the module (34). The module (41) is used to calculate the function F4(T) based on the measured value of the polymerisation temperature T (35). The module (42) is used to calculate the function F5 (Cc) based on the value of the catalyst concentration Cc (36). The module (43) is used to calculate the function F6(Cco) based on the value of the cocatalyst concentration Cco (37). The module (44) is used to calculate the function F7 (Pd,Td) based on the measured values of the distillation pressure Pd (38) and of the distillation temperature Td (46). A computing module (53) is used to calculate a mean value Pmean of the property P of the polyisobutene based on the mass fraction of polyisobutene manufactured at time t, calculated by a computing module (51) based on the mass flow rate of polyisobutene manufactured (50), the mass fraction of polyisobutene manufactured at time t-dt, calculated by this same computing module (51) and stored in a memory (52), the instantaneous value at time t of the said property P and the mean value measured at time t-dt of the said property P, stored in a memory (54).

A regulator (55):

(i) compares the mean value Pmean of the property P of the polyisobutene with the set-point C corresponding to the target value V of the said property P (56);

(ii) calculates the difference E=C−Pmean between these two values; and (iii) depending on the difference E, it varies, for example, the feed rate Qc of catalyst delivered by a pump (57) in order to make the property P tend towards the set-point C: either the difference E is negative or below the negative limit of a predefined range centred around zero, the catalyst feed rate Qc then being increased; or the difference E is positive or above the positive limit of the said range, the catalyst feed rate Qc then being decreased; or the difference E is zero or lies within the limits of the said range, the catalyst feed rate Qc then remaining unchanged.

In the present description, as well as in the present figures, the following symbols are used:

| | |
|---|---|
| PiC4: | isobutene partial pressure in the gas phase of the reactor; |
| Qc: | catalyst feed rate in the reactor; |
| Qco: | cocatalyst feed rate in the reactor; |
| Qh: | feed rate of the C4 hydrocarbon feed in the reactor; |
| CiC4: | isobutene concentration in the C4 hydrocarbon feed or in the gas phase of the reactor; |
| $CiC4_{R2}$: | isobutene concentration in the boiling liquid reaction phase; |
| Ci: | concentration of compound "i" of the C4 hydrocarbon feed in the said feed or in the gas phase of the reactor; |
| $Ci_{R2}$: | concentration of compound "i" of the boiling liquid reaction phase in the said liquid reaction phase; |
| Cc: | catalyst concentration with respect to the boiling liquid reaction phase or to the C4 hydrocarbon feed in a given time; |
| Cco: | cocatalyst concentration with respect to the boiling liquid reaction phase or to the C4 hydrocarbon feed in a given time; |
| T: | polymerisation temperature; |
| Td: | distillation temperature at which the polyisobutene manufactured is distilled; |
| P: | property of the polyisobutene selected from the viscosity or the average molecular mass; |
| Pmean: | average value of P; |
| Pinst: | instantaneous value of P; |
| Pd: | distillation pressure at which the polyisobutene manufactured is distilled. |
| Fi, F1, F2, F3, F4, F5, F6, F7: | functions |
| $k_{HO}$, ki: | constants |
| A2, A3, A4, A5, A6, A7: | constants |
| B2, B3, B5, B6, B7: | constants |
| C, C2, C3, C4, C5, C6, C7: | constants |
| $Ci_{mean}$: | constant |
| a, n, m, ΔP: | constants. |

The following example has the purpose of illustrating the present invention in a non-limiting manner.

EXAMPLE

A continuous production of polyisobutene was carried out in a device as shown schematically in FIG. 1 and in particular equipped with the control system (23) comprising regulators and computing modules as described schematically in FIG. 2.

The polymerisation reactor (1) was continuously fed with a C4 hydrocarbon feed through the feed line (5) containing by weight 4.5% of 1-butene, 13% of cis 2-butene, 24% of trans 2-butene, 47% of isobutene, 1.5% of isobutane and 10% of n-butane. The introduction flow rate of the C4 hydrocarbon feed in the reactor was 20 T/h. The polymerisation temperature was kept constant and equal to 10° C. The absolute total pressure in the reactor was kept constant and equal to 1.1 bar (i.e. 0.11 MPa).

A catalyst system comprising ethyl aluminium dichloride (EADC) as catalyst and tert-butyl chloride (TBC) as cocatalyst was used. The catalyst (EADC) and the cocatalyst (TBC) were continuously introduced into the reactor (1) through the feed lines respectively (6) and (7) with the feed rates respectively of 23 kg/h and 5 kg/h.

The catalyst concentration Cc and the cocatalyst concentration Cco, both expressed with respect to the C4 hydrocarbon feed respectively were equal to 0.55 mole/tonne of C4 hydrocarbon feed and 2.7 mole/tonne of C4 hydrocarbon feed.

In the purification step, the distillation temperature Td was 198° C., and the distillation pressure Pd was 2.9 mm Hg (i.e. 393 Pa).

Figure 3:
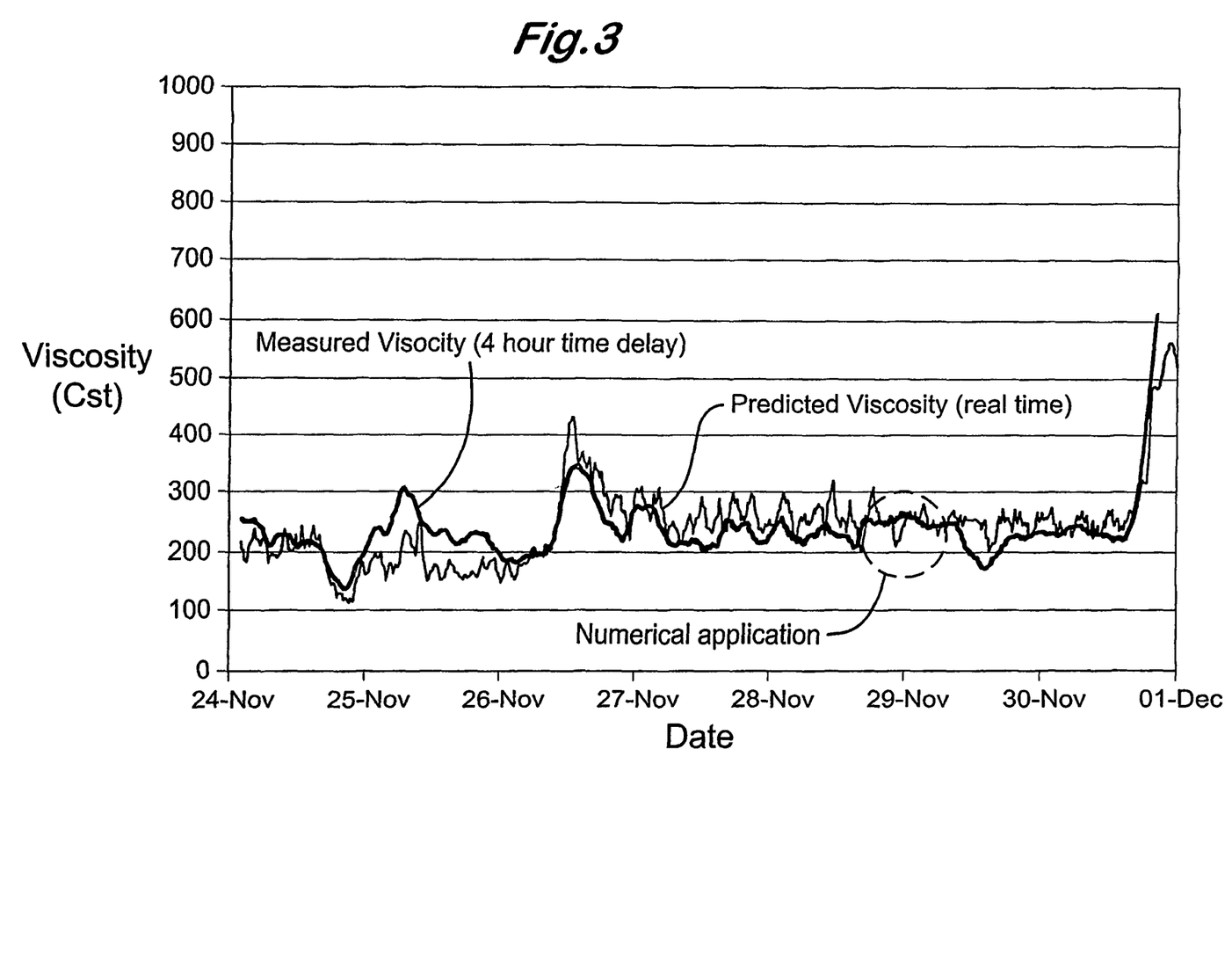
FIG. 3 shows a graphic plotting the kinematic viscosity (Cst) of polybutene versus time (day) during a continuous polybutene production using the process control of the present invention.

The property P of the polyisobutene was selected as being a kinematic viscosity (measured at 100° C.). A continuous production of a polyisobutene with a kinematic viscosity target value of 250 Cst was thus carried out as shown in FIG. 3 during 7 days between November 24$^{th}$ and December 1$^{st}$, while keeping constant the isobutene partial pressure (PiC4) in the gas phase of the reactor. On December 1$^{st}$, it was decided to change the quality of the polyisobutene manufactured and to start continuously producing a polyisobutene with a kinematic viscosity target value of 600 Cst.

During the continuous production, the kinematic viscosity of the polyisobutene manufactured was maintained around the target value V equal to 250 Cst:

by measuring the absolute total pressure in the reactor with the help of the pressure gauge (14): 1.1 bar (i.e. 0.11 MPa), and the isobutene mass concentration in the gas phase of the reactor with the help of a gas chromatograph analyser (15): 2.4% b.w., and by calculating the isobutene partial pressure PiC4: 26.4 mbar (i.e. 2.64 kPa), by calculating the isobutene concentration $CiC4_{R2}$ in the boiling liquid reaction phase (3) of the reactor by means of a first model predicting the value of $CiC4_{R2}$ from the previously measured value of PiC4 (2.64 kPa), the first model being based on the liquid/vapour equilibrium law and expressed in the form of the following formulae:

$$CiC4_{R2} = (PiC4 + \Delta P) \cdot [k_{HO} \cdot F1(Ci) \cdot F2(T)]^{-1} \quad (2b)$$

with:

$\Delta P = -4.091$ mbar $k_{HO} = 0.027$ $$F1(Ci) = [1 + 0.015 \, (C_{ibutane} - 3.8) - 0.016 \, (C_{ubutane} - 10) + 0.003 \, (C_{trans2\text{-}butene} - 19.6) - 0.027 \, (C_{cis2\text{-}butene} - 11.5) - 0.002 \, (C_{1\text{-}butene} - 8.1) + 0.014 \, (CiC4 - 45.7)] = 0.94 \quad (3)$$

with concentrations C being expressed as mass concentrations in the C4 hydrocarbon feed, and $$F2(T) = 211 + 3.519(T+20)^{1.60} = 1023 \quad (4)$$

with T being expressed in ° C., the resulting above-mentioned calculation of $CiC4_{R2}$ being: $CiC4R2 = 0.85$ mole of isobutene per tonne of the C4 hydrocarbon feed, by calculating an instantaneous value Pinst of the kinematic viscosity ($Visco_{inst}$) by means of a second model predicting the value of Pinst from the previously calculated value of $CiC4_{R2}$, the said second model comprising a function of the isobutene polymerisation kinetics comprising the following equation (11):

$$Visco_{inst} = 10^A \cdot 10^{F3(CiC4R2)} \cdot 10^{F4(T)} \cdot 10^{F5(Cc)} \cdot 10^{F6(Cco)} \cdot 10^{F7(Pd,Td)}$$

with:

$A = -9.1$ $$F3(CiC4_{R2}) = 1.04 \, CiC4_{R2} \, (1 + 0.47 \, CiC4_{R2})^{-1} = 0.63 \quad (6)$$

$$F4(T) = -5.3(10^{-4})[1 - 3(10^{-3}) \cdot T]^{-1} = -1 \quad (7b)$$

$$F5(Cc) = 8.98[1 + 0.18 \, (Cc)^{2.54}]^{-1} = 8.64 \quad (8)$$

$$F6(Cco) = 4.18 \, [1 + 0.12 \, Cco]^{-1} = 3.16 \quad (9)$$

$$F7(Pd,Td) = -7.5(10^{-3})Pd + 1.4 \, (10^{-4})Td = 0.006 \quad (10)$$

with Cc being the catalyst concentration expressed in mole per tonne of the C4 hydrocarbon feed, Cco being the cocatalyst concentration expressed in mole per tonne of the C4 hydrocarbon feed, T being the polymerisation temperature expressed in ° K, Pd being the distillation pressure expressed in mm Hg, Td being the distillation temperature expressed in ° C., the resulting above-mentioned calculation of $Visco_{inst}$ being: $Visco_{inst} = 220$ Cst and by varying the catalyst feed rate Qc in the reactor so as to make the instantaneous value Pinst ($Visco_{inst}$) tend towards the target value V = 250 Cst.

It was observed that the average prediction error for the kinematic viscosity in the present example was about +/−15% during all the production.

The invention claimed is:

1. A process for maintaining a property P of a polyisobutene around a target value V during a polymerisation of isobutene monomer that is carried out continuously in a reactor having a boiling liquid reaction phase which contains the monomer and the polyisobutene being formed and is in equilibrium with a gas phase above the liquid phase, the process comprising continuously introducing, into the reactor, a catalyst and a C4 hydrocarbon feed containing the isobutene monomer, continuously withdrawing, from the reactor the boiling liquid reaction phase and subsequently subjecting, continuously, the liquid reaction phase to at least one purification step to isolate the polyisobutene produced, wherein the property P is the viscosity or the average molecular mass of the polyisobutene produced, and wherein said property P of the polyisobutene produced is maintained around the target value V:

i) by measuring at least the isobutene partial pressure PiC4 in the gas phase of the reactor;

ii) by calculating the isobutene concentration $CiC4_{R2}$ in the boiling liquid reaction phase from at least the previously measured value of PiC4 according to the following formula:

$$CiC4_{R2}=PiC4\cdot[k_{HO}\cdot F1(Ci)\cdot F2(T)]^{-1};$$

where $K_{HO}$ is a constant;
Fi(Ci) is determined by the following equation:

$$F1(Ci)=1+\Sigma ki\cdot(Ci-Ci_{mean});$$

where Ci is a concentration of at least one comoound i of the C4 hydrocarbon feed in the feed or in the aas phase of the reactor, ki being a (oositive or negative) constant, $Ci_{means}$ is a constant; and F2(T) is determined by the following equation:

$$F2(T)=1A2\cdot(T+B2)^{C2};$$

where T is the polymerization temperature and A2, B2 and C2 are constants;
iii) by calculating an instantaneous value Pinst of the property P according to the equation:

$$Pinst=C\cdot C3^{F3}\cdot C4^{F4}\cdot C5^{C5}\cdot C6^{F6}.$$

where C, C3, C4, C5 and C6 are constants;
F3 is determined by the equation:

$$F3=A3\cdot CiC4_{R2}\cdot(1+B3\cdot CiC4_{R2})^{-1}$$

where A3 and B3 are constants and $CiC4_{R2}$ is as defined above;
F4 is determined by the equation:

$$F4=A4\cdot T,$$

or $$F4=A4\cdot T\cdot(1+B4\cdot T)^{-1}$$

where A4 and B4 are constants and T is the polymerization temperature;
F5 is determined by the equation:

$$F5=A5\cdot[1+B5\cdot(Cc)^n]^{-1}$$

where A5 and B5 are constants and Cc is a catalyst concentration; and
F6 is determined by the equation:

$$F6=A6\cdot[1+B6\cdot(Cco)^m]^{-1}$$

where A6, B6 and m are constants and Cco is a cocatalyst concentration; or
according to the equation:

$$Pinst=C\cdot C3^{F3}\cdot C4^{F4}\cdot C5^{F5}\cdot C6^{F6}\cdot C7^{F7}$$

where C7 is a constant and F7 is determined by the equation:

$$F7=A7\cdot Pd+B7\cdot Td$$

wherein A7 and B7 are constants, Pd is a distillation pressure and Td a distillation temperature at which the polyisobutene produced is distilled;
iv) optionally, by calculating a mean value Pmean of the property P by means of a dynamic model predicting the value of Pmean from the previously calculated value of Pinst; and v) by varying at least one process parameter so as to make the instantaneous value Pinst or the mean value Pmean tend towards the target value V of the property P.

2. The process according to claim 1, wherein the property P is the kinematic viscosity, the dynamic viscosity, the specific viscosity, the reduced viscosity or the intrinsic viscosity of the polyisobutene produced.

3. The process according to claim 1, wherein the property P is the number-average molecular mass $M_n$, the weight-average molecular mass $M_w$ or the viscosity-average molecular mass $M_v$ of the polyisobutene produced.

4. The process according to any one of claims 1 to 3, wherein the catalyst includes a catalyst suitable for the cationic polymerisation of olefins in the presence of a cocatalyst and the molar ratio of the amounts of cocatalyst and catalyst introduced into the reactor is maintained at a constant value.

5. The process according to claim 4, wherein the molar ratio of the amounts of cocatalyst and catalyst introduced into the reactor is in the range from 0.05 to 20.

6. The process according to claim 1, wherein in addition to the isobutene partial pressure PiC4 being measured, at least one of the process parameters chosen from a polymerisation temperature T and a concentration Ci of at least one compound "i" of the C4 hydrocarbon feed in the feed and/or in the gas phase of the reactor is also measured.

7. The process according to claim 1, wherein in addition to the isobutene partial pressure PiC4 being measured, at least one of the process parameters chosen from a catalyst feed rate Qc in the reactor, a cocatalyst feed rate Qco in the reactor, a distillation pressure Pd and a distillation temperature Td at which the polyisobutene produced is distilled, is also measured.

8. The process according to claim 1, including varying at least one process parameter selected from a polymerisation temperature T, a catalyst feed rate Qc in the reactor, a cocatalyst feed rate Qco in the reactor, a C4 hydrocarbon feed flow rate Qh in the reactor, a distillation pressure Pd and a distillation temperature Td at which the polyisobutene produced is distilled, so as to make the instantaneous value Pinst or the mean value Pmean tend towards the target value V of the property P.

9. The process according to claim 1, including varying at least one process parameter selected from a catalyst feed rate Qc in the reactor, a cocatalyst feed rate Qco in the reactor and a C4 hydrocarbon feed flow rate Qh in the reactor, so as to make the instantaneous value Pinst or the mean value Pmean tend towards the target value V of the property P.

10. The process of claim 5, wherein the range is from 1 to 10.

11. The process of claim 1, wherein the constants C, C3, C4, C5 and C6 or the constants C, C3, C4, C5, C6, and C7 are equal to 10.

* * * * *